United States Patent [19]
Gerke, Jr. et al.

[11] 3,843,224
[45] Oct. 22, 1974

[54] DETACHABLE CORD SET FOR ELECTRIC DEVICE

[75] Inventors: Burton Elwood Gerke, Jr.; Lewis Hampton Rohr, both of Baltimore, Md.

[73] Assignee: The Black and Decker Manufacturing Company, Towson, Md.

[22] Filed: Dec. 21, 1972

[21] Appl. No.: 317,406

[52] U.S. Cl.............. 339/58, 339/89 R, 339/91 R, 339/184 M, 339/211
[51] Int. Cl............................................. H01r 11/02
[58] Field of Search........ 339/91 R, 58, 75 R, 89 R, 339/89 M, 126, 129, 186 R, 186 M, 184 R, 184 M, 28, 75 M, 75 MP, 75 P, 211, 90 R, 90 C, 90 F, 188 R, 188 C, 63 R; 285/362, 82, 377

[56] References Cited
UNITED STATES PATENTS

| | | | |
|---|---|---|---|
| 1,722,816 | 7/1929 | Meunier | 310/50 X |
| 1,899,360 | 2/1933 | Roudebush et al. | 339/91 R |
| 2,301,572 | 11/1942 | Nowosielski | 339/90 C |
| 2,776,385 | 1/1957 | Modrey | 310/50 X |
| 2,787,770 | 4/1957 | Arson | 339/63 R |
| 2,947,966 | 8/1960 | Francis et al. | 339/188 |
| 3,054,080 | 9/1962 | Jepson | 339/66 |
| 3,309,113 | 3/1967 | Beach | 285/362 |
| 3,551,880 | 12/1970 | Hartwell | 339/89 M |
| 3,594,696 | 7/1971 | Witek, Jr. | 339/91 R |

FOREIGN PATENTS OR APPLICATIONS

| | | | |
|---|---|---|---|
| 1,056,222 | 4/1959 | Germany | 339/184 M |

*Primary Examiner*—Werner H. Schroeder
*Attorney, Agent, or Firm*—Joseph R. Slotnik; Leonard Bloom; Edward D. Murphy

[57] ABSTRACT

An electric power device including a housing having an electric motor therein. The motor is connected to an electric power source by a cord set detachably secured to the housing and to electrical connector means for the motor. The detachable cord set and its connection to the device is constructed to fulfill all known safety requirements. Furthermore, the cord set of this invention permits utilization of one cord for a variety of electrical devices and includes a built-in safety protection means whereby a light-duty cord cannot be connected to an electrical device having heavy-duty requirements.

10 Claims, 18 Drawing Figures

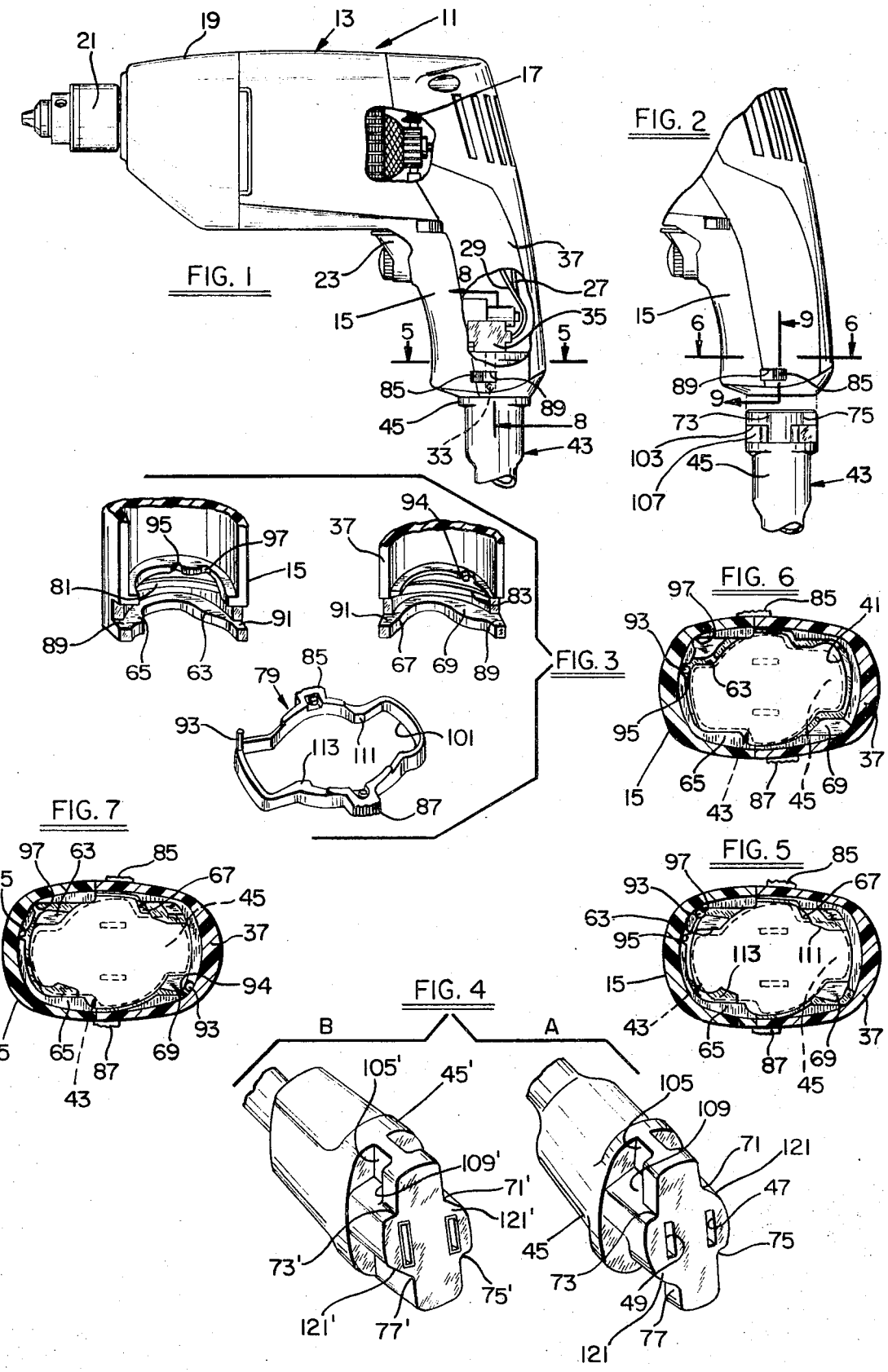

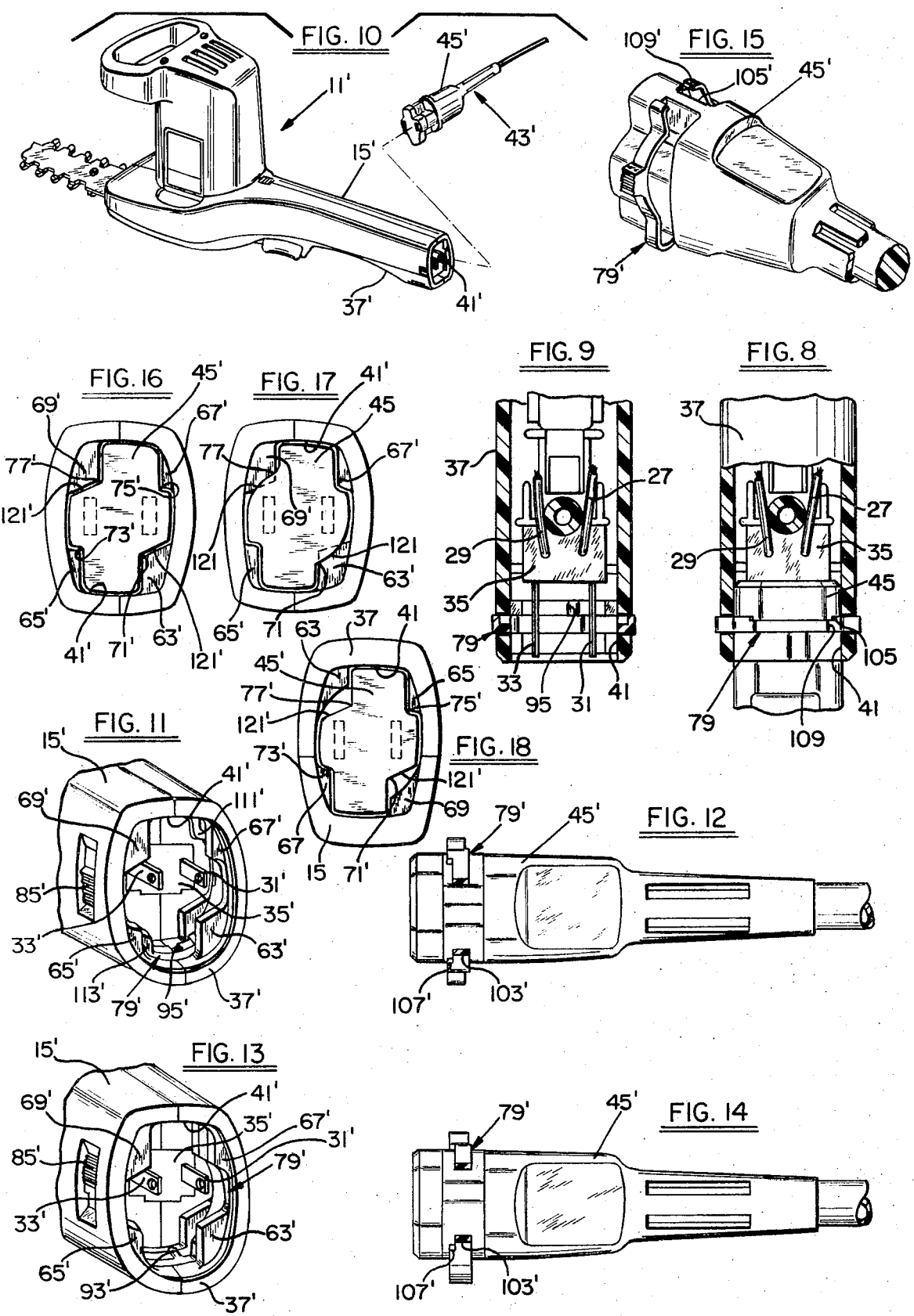

DETACHABLE CORD SET FOR ELECTRIC DEVICE

SUMMARY OF THE INVENTION

This invention is directed to a novel detachable electric cord set for an electric power device. The inventive cord set includes cooperating electrical plug members formed on a housing of the device and on one end of an extension cord, respectively, the other end of the extension cord adapted to be plugged into a conventional wall receptacle, or to another extension cord. The housing includes means releasably retaining the said one end of the extension cord. As an additional feature, the housing and extension cord are formed such that the device can be connected only to an extension cord which meets or exceeds the load capacity required by that electrical device. In this way, a minimum number of cords, possibly only one, are required to operate a variety of electric powered devices, and this is achieved with the utmost in safety. This reduces costs and expense to the user and minimizes storage problems for his electric devices.

In addition to the foregoing, the cord set of the present invention is constructed with the utmost in simplicity and is, therefore, relatively inexpensive, while being reliable in performance and safe and efficient in use. Furthermore, the retaining means can be set to render the extension cord permanently attached to the device.

BRIEF DESCRIPTION OF THE DRAWINGS

FIG. 1 is a side elevational view illustrating an electric device, here, a power tool, and showing a cord set embodying the present invention attached thereto through the tool handle;

FIG. 2 is a partial view, similar to FIG. 1, showing the cord set detached;

FIG. 3 is an exploded perspective view showing the parts of the inventive cord set which are incorporated in the tool handle;

FIG. 4 shows perspective views of the part of the inventive cord set incorporated in cord connectors of two extension cords, one being adapted for use in heavy-duty and one in light-duty devices;

FIG. 5 is an enlarged sectional view of FIG. 1 taken along the line 5—5 thereof;

FIG. 6 is an enlarged sectional view of FIG. 2 taken along the line 6—6 thereof;

FIG. 7 is a view similar to FIG. 5 and showing the retaining means in position for permanent cord set retention;

FIG. 8 is an enlarged sectional view of FIG. 1 taken along the line 8—8 thereof;

FIG. 9 is an enlarged sectional view of FIG. 2 taken along the line 9—9 thereof;

FIG. 10 is a perspective view showing a heavy duty power tool and a detached extension cord usable therewith, the parts showing features of the present invention;

FIG. 11 is an enlarged perspective view showing the tool handle of the cord set of FIG. 10 with the locking ring in position for cord retention;

FIG. 12 is a plan view showing the connector portion of the extension cord used with the structure of FIG. 11 and showing the locking ring, carried by the handle, in locking retention thereon;

FIG. 13 is a view similar to FIG. 11 but showing the locking ring in the released position;

FIG. 14 is a view similar to FIG. 12 and showing the locking ring in the FIG. 13 position;

FIG. 15 is an enlarged perspective view of the extension cord connector of FIGS. 10, 12 and 14 and showing the locking ring, carried by the handle, in position thereon;

FIG. 16 is a schematic view showing the manner in which a heavy-duty cord connector is accepted in a heavy-duty device opening;

FIG. 17 is a view similar to FIG. 16 and showing the manner in which a heavy-duty device rejects a light-duty cord connector; and FIG. 18 is a view similar to FIGS. 16 and 17 and showing the manner in which a light-duty device accepts a heavy-duty cord.

DETAILED DESCRIPTION

Referring now more specifically to the drawings, a portable electric drill, which is one type of relatively lightduty, electric powered device in which the invention finds particular use, is illustrated generally at 11 in FIG. 1 and is seen to include a motor housing 13 having a dependent handle 15 rigid therewith. A motor 17 in the housing 13 is connected to a gear train (not shown) disposed within a gear case 19 fixed to the motor housing 13. A tool output, here a drill chuck 21, extends forwardly from the gear case 19 and is driven by the motor 17. A trigger switch 23 is provided on the handle 15 and is connected to one electrical lead (not shown) from the motor 17. Another lead 27 from the motor 17 and a lead 29 from the trigger switch 23 extend to the lower terminus of the handle 15 and are suitably connected to a pair of male plug blades 31, 33, respectively.

As shown in FIGS. 1 and 9, the plug blades 31, 33 are set into a suitable body 35 trapped between the dependent handle 15 and a detachable handle cover 37 secured in place by suitable fasteners. The plug blades 31, 33 extend into a recess or opening 41 formed at the terminus of the handle 15 and handle cover 37, and together therewith form a part of the novel detachable cord set of the present invention.

An extension cord, generally illustrated at 43, is adapted to be electrically connected to the tool 11 and retained in place on the handle. To this end, the extension cord 43 has a female cord connector 45 formed in place on one end thereof and is adapted to snugly and slidably fit into the opening 41. As shown, the cord connector 45 has suitable apertures 47, 49 adapted to receive plug blades 31, 33, respectively. Suitable terminals are disposed within the apertures 47, 49 and are electrically connected to leads which terminate in connection to plug blades at the other end of the extension cord 43.

The cord connector 45, as described above, is adapted to be inserted into the opening 41 in the tool handle 15. As shown, the opening 41 is generally complementary in cross section to that of the connector 45 and snugly but slidably receives the connector 45 therein. For proper insertion of the connector 45, note that handle 15 has lugs 63, 65, while handle cover 37 has lugs 67, 69 which fit into complementary shaped recesses 71, 73, 75, 77, respectively, on the connector 45. When the lugs and recesses are properly aligned and the connector 45 inserted into the opening 41, slots 47, 49 slidably receive plug blades 31, 33, respectively, and the extension cord 43 is electrically connected to the tool 11.

Means is provided to releasably retain the connector 45 in the opening 41. This means comprises a locking ring 79 trapped in grooves 81, 83 formed in the handle and handle cover 15, 37, respectively. The ring 79 has a pair of oppositely disposed finger tabs 85, 87 which extend radially outwardly through elongated apertures 89, 91, respectively, formed in the handle and handle cover 15, 37. As shown, the tabs 85, 87 may be knurled so that the user may readily turn the ring 79 using his thumb and forefinger, the extent of turning movement being determined by the dimension of the apertures 89, 91 as compared with the tabs 85, 87. A detent pin 93 cooperates with detent recesses 95, 97 formed in the handle 15 to retain the ring 79 into arcuately disposed positions, as will be described.

As shown in FIG. 3, the ring 79 defines an internal cruciform opening 101. This opening 101 is substantially the same shape as the opening 41 formed in the handle 15 and handle cover 37, and is substantially complementary to the cross section of the cord connector 45. Thus, when the ring 79 is oriented and aligned with the opening 41, the cord connector 45 can be easily inserted and removed from this opening 41. However, the locking ring 79 is adapted to be turned within the handle 15 so as to releasably lock the cord connector 45 in place in the opening 41.

Thus, the cord connector 45 has a pair of oppositely disposed cutouts defining a pair of recesses 103, 105 and having adjacent shoulders 107, 109, respectively. With the connector 45 fully inserted into the opening 41 in the handle 15, the locking ring 79 can be turned in a clockwise direction from the position shown in FIG. 6 to the position shown in FIG. 5, whereupon shoulders 111, 113 on ring 79 are located in slots 105, 103 and behind shoulders 109, 107, respectively. In this position, detent pin 93 is located in detent recess 97 and the cord connector 45 is securely locked in place in the handle. When it is desired to detach the extension cord 43 from the tool 11, the locking ring 79 is turned in a counterclockwise direction to the position shown in FIG. 6, to realign the cruciform opening 101 of the locking ring 79 with the opening 41. In this position of the locking ring, the cord connector 45 is easily removed from the tool handle. Detent pin 93 is now located in detent recess 95 to hold the locking ring 79 in this position.

In the event it is desired to permanently attach the extension cord 43 to the tool 11, the handle 15 and handle cover 37 are first separated and the locking ring 79 removed. The ring 79 is then fitted over the cord connector 45 and locked in position behind the shoulders 107, 109. The assembled ring 79 and connector 45 are then relocated within that portion of the opening 41 formed in handle 15, by inserting plug blades 31, 33 into apertures 49, 47, respectively, and the handle cover 37 is reattached to handle 15. In this position of the parts, shown in FIG. 7, the detent pin 93 is located in a recess 94 opposite the recesses 95, 97, and the ring 79 is prevented from turning so that it cannot now release from the cord connector 45. The connector 45 (and extension cord 43) is thus permanently attached in electrical connection to the tool 11 and can only be removed upon disassembly of the handle and handle cover 15, 37.

As described above, it may be desirable to make certain extension cords interchangeably usable with a variety of tools or other devices, and to some extension cords usable only with certain tools or devices. For example, heavier-duty or higher capacity extension cords can safely be used with tools or devices having either light or heavy-duty requirements. On the other hand, light-duty extension cords should be used only with those tools or devices having light-duty power requirements. For example, in the power tool field, outdoor tools, such as lawnmowers, trimmer edgers, hedge trimmers, and the like, require heavy-duty cords, while generally, indoor products, such as drills, jig saws, sanders, etc. require only light-duty cords. Thus, a heavy-duty extension cord can service either light-duty or heavy-duty products, while a light-duty cord set can safely be used only with light-duty products.

A feature of the present invention resides in the provision of a cord set construction which accommodates this condition, that is, one where a heavy-duty extension cord can be used with any product, whether light or heavy-duty, and wherein a light-duty extension cord is usable only with a light-duty product.

To this end, the cord connector 45 and the tool handle opening 41 described above are provided on a light-duty extension cord and on a light-duty tool, respectively. A heavy-duty cord connector, illustrated at 45' in FIGS. 4b, 10, 12, 14 and 15, is provided for cooperative engagement in an opening 41' formed in a handle 15' and a handle cover 37' of a heavy-duty tool 11', such as a hedge trimmer, as shown in FIGS. 10, 11 and 13. The cord connector 45' is provided with a smaller radius 121' than that shown at 121 for the receptacle body 45. Similarly, the opening 41', shown in FIGS. 11 and 13, include larger lugs 63', 69' than those shown at 63, 69 for opening 41. These lugs 63', 69' are shaped generally complementary to recesses 71', 77' on the cord connector 45', so that when the cord connector 45' is inserted into the opening 41', the parts are positioned substantially as shown schematically in FIG. 16 with the lugs 63', 69' closely fitted into recesses 71', 77', respectively. Lugs 65', 67' are substantially the same as lugs 65, 67, respectively, in opening 41, and are generally complementary to the shape of recesses 73', 75', respectively.

The cord connector 45' is retained in place in the opening 41' by locking ring 79' which is substantially identical to the ring 79. The ring 79' is shown in FIG. 11 as located to retain the cord connector 45' in place in the opening 41', and in FIG. 13 as located for entry or withdrawal of the cord connector 45' with respect to the opening 41'. Thus, the cord connector 45' is provided with notches 103', 105', and shoulders 107', 109', substantially identical to notches 103, 105, and shoulders 107, 109, respectively, on cord connector 45. In all other respects, the structure of the handle 15' and cover 37' defining opening 41', and that of cord connector 45' is the same as described for handle 15, cover 37, and cord connector 45, so that like primed (') numbers refer to like parts.

It will be appreciated that should one attempt to insert the cord connector 45 into the opening 41', lugs 63', 69' will interferringly engage the radii 121 adjacent recesses 71, 77, respectively, as shown in FIG. 17. Thus, connector 45 of light-duty extension cord 43 is rejected and cannot be inserted into the opening 41' or connected to the heavy-duty tool 11'. Conversely, the cord connector 45' of heavy-duty extension cord 43' is accepted by and can readily be inserted into the opening 41 in light-duty tool 11 and electrically connected thereto since the cord connector recesses 73', 75' are substantially complementary to the lugs 65, 67, respectively, and the lugs 63, 69 are somewhat smaller than the recesses 71', 77', respectively. (See FIG. 18). Thus, cord connector 45' of the heavy-duty extension cord 43' is adapted for use either with the light-duty tool 11 or the heavy-duty tool 11', while cord connector 45 of light-duty extension cord 43 is usable only with light duty tool 11. It will be understood, then, that a user can maintain one extension cord, namely, a heavy-duty extension cord of the type having a cord connector 45', thereon, and this will be sufficient to operate all of his tools regardless of whether they are heavy-duty of light-duty versions.

By the foregoing, there has been disclosed a novel cord set calculated to fulfull the inventive objects hereinabove set forth, and while a preferred embodiment of the present invention has been illustrated and described in detail, various additions, substitutions, modifications and omissions may be made thereto without departing from the spirit of the invention.

What is claimed is:

1. A detachable cord set construction in combination with an electric powered device comprising a housing having an electric motor therein, means defining an opening formed in the exterior of said housing, plug means carried by said housing and located in said opening and fixed relative to said housing, said plug means being electrically interconnected with said motor, an extension cord having a cord connector fitting into said housing opening, said cord connector having plug means electrically interconnecting with said plug means in said opening, said cord connector also having shoulder means thereon, locking means turnably mounted within said housing for movement through less than 180°, said housing including at least one aperture therein adjacent said locking means, said locking means including a portion extending outwardly of said housing through said aperture, said locking means further including at least one shoulder means adapted to engage said shoulder means on said cord connector, said locking means being movable from a first position allowing free insertion and removal of said cord connector to and from said housing opening, to a second position where said locking means securely retains said cord connector in said housing opening by engagement of said shoulder means on said locking means with said shoulder means on said cord connector.

2. A detachable cord set construction in combination with an electric powered device comprising a housing having an electric motor therein, means defining an exteriorly accessible opening in said housing, plug means carried by said housing and located within said opening and connected to said motor, an extension cord having a cord connector at one end thereof, said cord connector being slidably fitted in said housing opening, said cord connector having plug means electrically connecting with said plug means in said opening and including a plurality of shoulder means, a locking ring turnably carried within said housing and located inwardly of the access to said housing opening, two opposed apertures in said housing adjacent said locking ring, said locking ring having two portions respectively accessible exteriorly of said housing through said apertures for manual turning thereof, said locking means further including a plurality of shoulder means adapted to engage said plurality of shoulder means on said cord connector, said locking ring being turnable in opposite directions, through less than 180°, from a first position where said cord connector is freely insertable into and removable from said housing opening, to a second position where said cord connector is securely retained within said housing opening by engagement of said shoulder means on said locking means with said shoulder means on said cord connector.

3. A detachable cord set in combination with an electric powered device comprising a housing having an electric motor therein, means defining an exteriorly accessible opening in said housing, plug means carried by said housing and extending into said opening, means electrically connecting said plug means with said motor, an extension cord having a cord connector at one end received in said housing opening and electrically connected to said plug means, said cord connector including a plurality of shoulder means, locking means carried by one of said housing and said cord connector and turnable through less than 180° relative to both, a plurality of apertures in said housing adjacent said locking means, said locking means including a plurality of tab means one extending through each of said apertures, said locking means further including a plurality of shoulder means within said housing arranged to engage said shoulder means on said cord connector, said locking means, when in one position, releasably retaining said cord connector within said housing opening by engagement of said shoulder means on said locking means with said shoulder means on said cord connector, and when in another position facilitating assembly and disassembly of said cord connector and said plug means by straight axial movement, and detent means releasably retaining said locking means in said locking position.

4. A detachable cord set construction in combination with an electric powered device including a housing having an electric motor disposed therein, means defining an exteriorly accessible opening in said housing, electrical connector means fixed within said opening and connected to said motor, an extension cord including a cord connector received in said opening, said cord connector including electrical connector means interfitting with said electrical connector means in said opening when said cord connector is located therein, locking means on one of said opening defining means and said cord connector and movable from a first position where said cord connector may be freely inserted into and removable from said opening defining means, to a second position where said cord connector is securely retained within said opening, said locking means being positionable substantially permanently in a third position wherein said locking means is cooperable with said opening defining means and said cord connector to substantially permanently retain said cord connector to said opening defining means.

5. A detachable cord set construction in combination with an electrically powered device comprising a housing having an electric motor supported therein, means defining an exteriorly accessible opening in said housing, electrical connector means fixed within said opening and electrically connected to said motor, an extension cord including a cord connector at one end snugly, slidably, and nonrotatably received in said opening, said cord connector including connector means connecting with said electrical connector means in said opening, said cord connector also having shoulder means thereon, locking means mounted in said housing, releasably retaining said cord connector within said housing opening, said locking means including a ring defining an opening substantially complementary to the cross section of said cord connector, at least one aperture in said housing, said locking means including at least one portion thereof extending through said aperture, said ring including shoulder means and being turnable through a limited arc from a first position where it freely, slidably received said cord connector, to a second position angularly spaced from said first position where said shoulder means on said ring interlocks behind said shoulder means on said cord connector, detent means in said opening defining means, said ring including detent means cooperable with said detent means in said opening defining means whereby to releasably retain said ring in each of said first and second positions.

6. A detachable cord set construction in combination with an electrically powered device comprising a housing having an electric motor supported therein, means defining a exteriorly accessible opening in said housing, electrical plug means fixed within said opening and electrically connected to said motor, an extension cord including a cord connector at one end received in said opening, said cord connector including plug means electrically interconnecting with said plug means in said opening, said cord connector also having a plurality of shoulder means thereon, locking means mounted in said housing inwardly of the access to said housing opening for releasably retaining said cord connector within said housing opening, a pair of apertures in said housing adjacent said locking means, said locking means having a pair of operating portions accessible from outside said housing through said apertures and being movable in a plane transverse to said cord connector, said locking means being movable from a first position where it allows free, slidable insertion and removal of said cord connector into and from said housing opening, to a second position where it securely retains said cord connector within said housing opening by engagement of said locking ring with said shoulder means.

7. A detachable cord set construction in combination with an electric powered device comprising a housing having an electric motor therein, means defining an opening formed in the exterior of said housing, plug means carried by said housing and located in said opening and fixed relative to said housing, said plug means being electrically interconnected with said motor, an extension cord having a cord connector fitting slidably and nonrotatably into said housing opening, said cord connector having plug means electrically interconnecting with said plug means in said opening, said cord connector having an end face and recess means spaced axially inwardly of said face, said recess means defining abutting shoulder means on said cord connector, locking means movably mounted within said housing, at least one aperture through said housing, said locking means including at least one portion extending through said aperture, said locking means being movable from a first position allowing free insertion and removal of said cord connector to and from said housing opening, to a second position where said locking means extends into said recess means and engages said shoulder means to securely retain said cord connector in said housing opening.

8. A detachable cord set construction in combination with an electric powered device comprising a housing having an electric motor therein, means defining an opening formed in the exterior of said housing, plug means carried by said housing and located in said opening and fixed relative to said housing, said plug means being electrically interconnected with said motor, an extension cord having a cord connector fitting slidably and nonrotatably into said housing opening in two rotative positions generally 180° apart, said cord connector having plug means electrically interconnecting with said plug means in said opening, said cord connector having a non-circular cross-section, an end face, and a pair of recesses spaced axially inwardly of said face, said recesses defining a pair of abutting shoulders on said cord connector, locking means substantially enclosed within said housing adjacent said opening, at least one aperture through said housing adjacent said locking means, said locking means including an operatorengageable portion extending through said aperture, said locking means being movable from a first position allowing free insertion and removal of said cord connector to and from said housing opening, to a second position where said locking means extends into said recesses and engages said shoulders to securely retain said cord connector in said housing opening.

9. An electrically powered device comprising a housing having an electric motor supported therein, means defining an exteriorly accessible opening in said housing, electrical plug means fixed within said opening and electrically connected to said motor, locking means mounted in said housing inwardly of the access to said housing opening for releasably retaining a cord connector within said housing opening, at least one aperture in said housing adjacent said locking means, said locking means having an operating portion accessible from outside said housing through said aperture and being movable in a plane transverse to said opening, said locking means including a plurality of shoulder means and being movable from a first position where said shoulder means are aligned with said opening defining means to allow free, slidable insertion and removal of said cord connector into and from said housing opening, to a second position where said shoulder means extend into said opening into engagement with said cord connector to securely retain said cord connector within said housing opening.

10. An electric powered device comprising a housing having an electric motor therein, means defining an exteriorly accessible opening in said housing, plug means carried by said housing and located within said opening and connected to said motor, a locking ring turnably carried within said housing, at least one aperture in said housing adjacent said locking means, said locking ring having at least a portion accessible exteriorly of said housing through said aperture for manual turning thereof, said locking ring including a plurality of shoulder means and being turnable in opposite directions, through less than 180°, from a first position where said shoulder means are aligned with said opening defining means to allow a cord connector to be freely insertable into and removable from said housing opening, to a second position where said shoulder means extend into said opening into engagement with said cord connector to securely retain said cord connector within said housing opening, and detent means releasably retaining said ring in said second position.

* * * * *